(No Model.)
J. MUHR.
CLOSURE FOR COUPLINGS.
No. 605,323. Patented June 7, 1898.
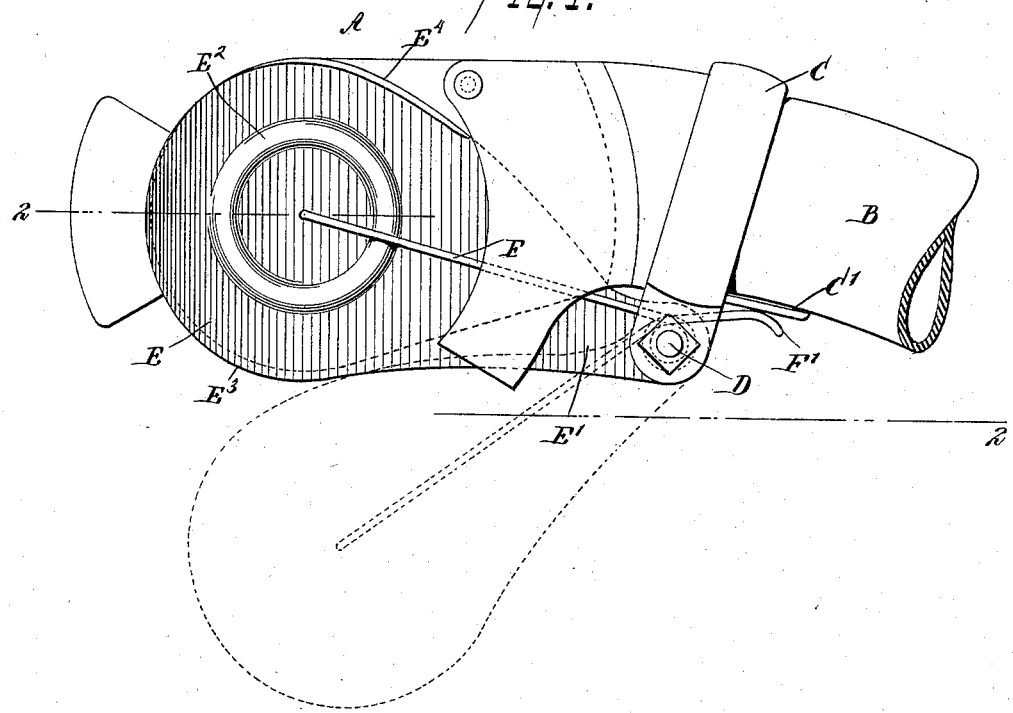
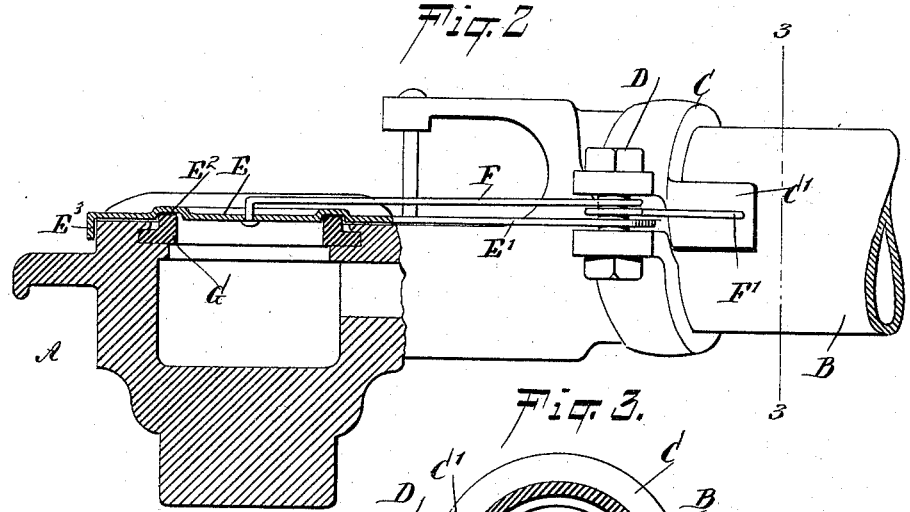
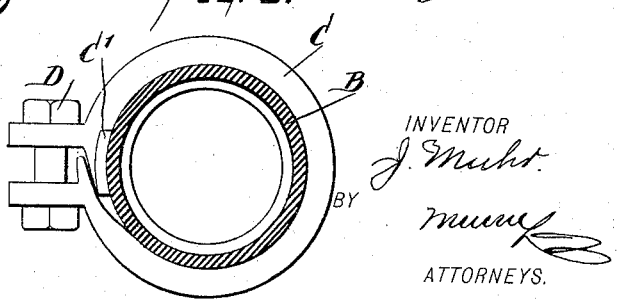
WITNESSES:
William P. Goebel
INVENTOR
J. Muhr
BY
ATTORNEYS.

UNITED STATES PATENT OFFICE.

JOSEPH MUHR, OF DUNKIRK, NEW YORK.

CLOSURE FOR COUPLINGS.

SPECIFICATION forming part of Letters Patent No. 605,323, dated June 7, 1898.

Application filed November 10, 1897. Serial No. 658,053. (No model.)

*To all whom it may concern:*

Be it known that I, JOSEPH MUHR, of Dunkirk, in the county of Chautauqua and State of New York, have invented a new and Improved Closure for Couplings, of which the following is a full, clear, and exact description.

The invention relates to fluid-pressure brakes; and its object is to provide a new and improved closure for sealing an unused coupling member on the rear end of the last car to prevent dust, cinders, and other impurities from passing into the train-pipe, triple valves, and other parts of the fluid-pressure brake and to prevent kinks and twists in the coupling-hose usually incident to hanging up the unused coupling member in the dummy coupling, such dummy coupling being entirely dispensed with by the use of my device.

The invention consists of novel features and parts and combinations of the same, as hereinafter more fully described, and pointed out in the claims.

Reference is to be had to the accompanying drawings, forming a part of this specification, in which similar characters of reference indicate corresponding parts in all the figures.

Figure 1 is a plan view of the improvement as applied. Fig. 2 is a sectional side elevation of the same on the line 2 2 of Fig. 1, and Fig. 3 is a transverse section of the same on the line 3 3 of Fig. 2.

The coupling member A, of the usual construction, is attached to the free end of a hose B and is secured thereon by a suitable clamp C, having its ends connected with each other by a bolt D, which forms the fulcrum for an arm E', carrying a cap E, adapted to close the opening in the coupling member A when the latter is not in use, so as to prevent dust, cinders, and other impurities from passing through the coupling into the hose B, train-pipe, triple valves, and other parts of the air-brake system. A spring F is connected at its free end with the cap E, at the center thereof, and said spring is coiled on the bolt D and is formed with an extension F', resting or abutting against a flange C', formed on the clamp C and extending rearwardly on the hose B.

The cap E is formed on its under side with an annular recess $E^2$ for engagement with the projecting end of a rubber gasket G, set in the opening or mouth of the coupling A, as is plainly shown in Fig. 2, so that the flat portion of the cap E firmly rests on the flat metallic face of the coupling member to prevent dust and other impurities from passing on the said face and over the same into the opening of the coupling.

One side of the cap E is provided with a downwardly-turned flange $E^3$ for limiting the inward-swinging motion of the arm E' and the cap E to hold the latter in proper position over the face of the coupling member. At the opposite side of the cap E is formed an upwardly-turned flange $E^4$, adapted to be engaged by the other coupling member to conveniently swing the cap E off the face of the coupling member A when the operator couples the two members together.

Now it will be seen that by the arrangement described the spring F has a tendency to swing the arm E' and the cap E over the face of the coupling as soon as the other coupling member is removed from the coupling member A. As the cap E is recessed on its inside to fit over the gasket G, the latter is not liable to be injured by the attachment of the coupling member.

Having thus fully described my invention, I claim as new and desire to secure by Letters Patent—

1. A closure for couplings, comprising an arm mounted to swing, and formed with a cap, a spring for pressing against the said cap, and an upwardly-turned flange on the said cap, for moving the latter out of engagement with the face of the coupling, substantially as shown and described.

2. A closure for hose-couplings, the closure comprising a cap mounted to swing edgewise toward and from the coupling member to command the mouth thereof, the cap having a downwardly-projecting flange engaging the coupling member to limit the movement of the cap and the cap also having an upwardly-projecting flange adapted to be engaged by the companion coupling member to push the cap out of place.

3. A closure for couplings, the closure comprising a cap mounted to swing edgewise toward and from the coupling members to command the mouth thereof, the cap having an upwardly-projecting flange capable of being engaged by one of the coupling members as the two members are moved to connection, whereby the cap is moved edgewise out of active position.

JOSEPH MUHR.

Witnesses:
CHAS. T. GROSVENOR,
A. T. GIBSON.